(12) United States Patent
Tiwari et al.

(10) Patent No.: US 11,294,913 B2
(45) Date of Patent: Apr. 5, 2022

(54) COGNITIVE CLASSIFICATION-BASED TECHNICAL SUPPORT SYSTEM

(71) Applicant: International Business Machines Corporation, Armonk, NY (US)

(72) Inventors: Awadesh Tiwari, Chinapanahalli (IN); Ruchi Mahindru, Elmsford, NY (US); Ramshanker Kowta, Bangalore (IN); Jayachandran Kizhakoot Ramachandran, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 342 days.

(21) Appl. No.: 16/193,255

(22) Filed: Nov. 16, 2018

(65) Prior Publication Data

US 2020/0159837 A1 May 21, 2020

(51) Int. Cl.
| | |
|---|---|
| *G06F 16/2457* | (2019.01) |
| *G06F 16/35* | (2019.01) |
| *G06F 16/2458* | (2019.01) |
| *G06F 16/332* | (2019.01) |
| *G06Q 30/00* | (2012.01) |
| *G06F 16/248* | (2019.01) |
| *G06F 16/28* | (2019.01) |
| *G06F 16/2455* | (2019.01) |
| *G06F 40/295* | (2020.01) |
| *G06F 8/65* | (2018.01) |

(52) U.S. Cl.
CPC ...... *G06F 16/24578* (2019.01); *G06F 16/248* (2019.01); *G06F 16/2455* (2019.01); *G06F 16/2468* (2019.01); *G06F 16/285* (2019.01); *G06F 16/3329* (2019.01); *G06F 16/35* (2019.01); *G06F 40/295* (2020.01); *G06F 8/65* (2013.01); *G06Q 30/016* (2013.01)

(58) Field of Classification Search
CPC .......... G06F 16/24578; G06F 16/2468; G06F 16/35; G06F 16/3329; G06Q 30/016
See application file for complete search history.

(56) References Cited

U.S. PATENT DOCUMENTS

| | | | |
|---|---|---|---|
| 6,260,048 B1* | 7/2001 | Carpenter | G06F 11/0769 |
| 9,183,285 B1* | 11/2015 | Brown | G06F 16/355 |
| 2002/0042793 A1* | 4/2002 | Choi | G06F 16/335 |
| 2003/0149919 A1* | 8/2003 | Greenwald | G06F 11/2257 714/43 |
| 2004/0078190 A1* | 4/2004 | Fass | G06F 16/38 704/7 |
| 2005/0097396 A1* | 5/2005 | Wood | G06F 11/2252 714/25 |
| 2008/0034060 A1* | 2/2008 | Fisher | G06F 9/453 709/218 |

(Continued)

*Primary Examiner* — Marc S Somers
(74) *Attorney, Agent, or Firm* — Scott S. Dobson; Hunter E. Webb; Keohane & D'Alessandro PLLC

(57) ABSTRACT

Disclosed embodiments provide techniques for technical support. Previously reported problem reports are analyzed and symptoms are extracted. Solutions are associated with the previously reported problem reports. A newly submitted user problem is analyzed and symptoms are extracted and compared with the symptoms of the previously reported problems. Solutions are then associated with the user problem based on relevance to symptoms, product type, and/or other factors.

19 Claims, 11 Drawing Sheets

(56) References Cited

U.S. PATENT DOCUMENTS

| | | | |
|---|---|---|---|
| 2008/0091983 A1* | 4/2008 | Boss | G06Q 30/02 |
| | | | 714/48 |
| 2010/0017350 A1 | 1/2010 | Kar et al. | |
| 2010/0280985 A1* | 11/2010 | Duchon | G06Q 10/10 |
| | | | 706/52 |
| 2011/0295898 A1* | 12/2011 | Grabarnik | G06Q 10/103 |
| | | | 707/780 |
| 2012/0245925 A1 | 9/2012 | Guha et al. | |
| 2013/0011727 A1 | 1/2013 | Chang et al. | |
| 2013/0030948 A1* | 1/2013 | Fisher, Jr. | G06N 5/02 |
| | | | 705/26.5 |
| 2013/0036062 A1 | 2/2013 | Natarajan et al. | |
| 2013/0117267 A1 | 5/2013 | Buryak et al. | |
| 2013/0262501 A1* | 10/2013 | Kuchmann-Beauger | |
| | | | G06F 16/9024 |
| | | | 707/769 |
| 2015/0356142 A1* | 12/2015 | Proux | G06F 16/334 |
| | | | 706/11 |
| 2016/0196501 A1* | 7/2016 | Anand | G06F 11/079 |
| | | | 706/46 |
| 2016/0224910 A1* | 8/2016 | Deng | G06Q 30/016 |
| 2016/0239377 A1* | 8/2016 | Hooks | G06F 11/3006 |
| 2017/0075988 A1 | 3/2017 | Kadiri et al. | |
| 2017/0220554 A1* | 8/2017 | Carter | G06F 40/284 |
| 2018/0285750 A1* | 10/2018 | Purushothaman | G06N 5/045 |
| 2019/0220695 A1* | 7/2019 | Nefedov | G06F 16/38 |

* cited by examiner

COGNITIVE CLASSIFICATION-BASED TECHNICAL SUPPORT SYSTEM

FIELD

The present invention relates generally to computer systems, and more particularly, to a cognitive classification-based technical support system.

BACKGROUND

Technical support is a time-consuming and cost-intensive endeavor for many business organizations. Commerce, banking, government, communication, entertainment, and various other industries rely on a host of computer systems. Downtime on even one of these systems can be disruptive to a business or organization, potentially causing customer impact, as well as possible financial and/or logistical complications. Thus, timely resolution of such problems is an important factor for any large-scale organization.

SUMMARY

In one embodiment, there is provided a computer-implemented method for automated solution identification, comprising: deriving previously reported symptoms from a problem report database; receiving a user problem description; separating the user problem description into a plurality of linguistic entities; deriving one or more user symptoms from the plurality of linguistic entities; comparing the one or more user symptoms with the previously reported symptoms; and retrieving one or more solution descriptions associated with the previously reported symptoms from a technical solutions database.

In another embodiment, there is provided an electronic computation device comprising: a processor; a memory coupled to the processor, the memory containing instructions, that when executed by the processor, perform the steps of: deriving previously reported symptoms from a problem report database; receiving a user problem description; separating the user problem description into a plurality of linguistic entities; deriving one or more user symptoms from the plurality of linguistic entities; comparing the one or more user symptoms with the previously reported symptoms; and retrieving one or more solution descriptions associated with the previously reported symptoms from a technical solutions database.

In yet another embodiment, there is provided a computer program product for an electronic computation device comprising a computer readable storage medium having program instructions embodied therewith, the program instructions executable by a processor to cause the electronic computation device to perform the steps of: deriving previously reported symptoms from a problem report database; receiving a user problem description; separating the user problem description into a plurality of linguistic entities; deriving one or more user symptoms from the plurality of linguistic entities; comparing the one or more user symptoms with the previously reported symptoms; and retrieving one or more solution descriptions associated with the previously reported symptoms from a technical solutions database.

BRIEF DESCRIPTION OF THE DRAWINGS

Features of the disclosed embodiments will be more readily understood from the following detailed description of the various aspects of the invention taken in conjunction with the accompanying drawings.

Figure 1:
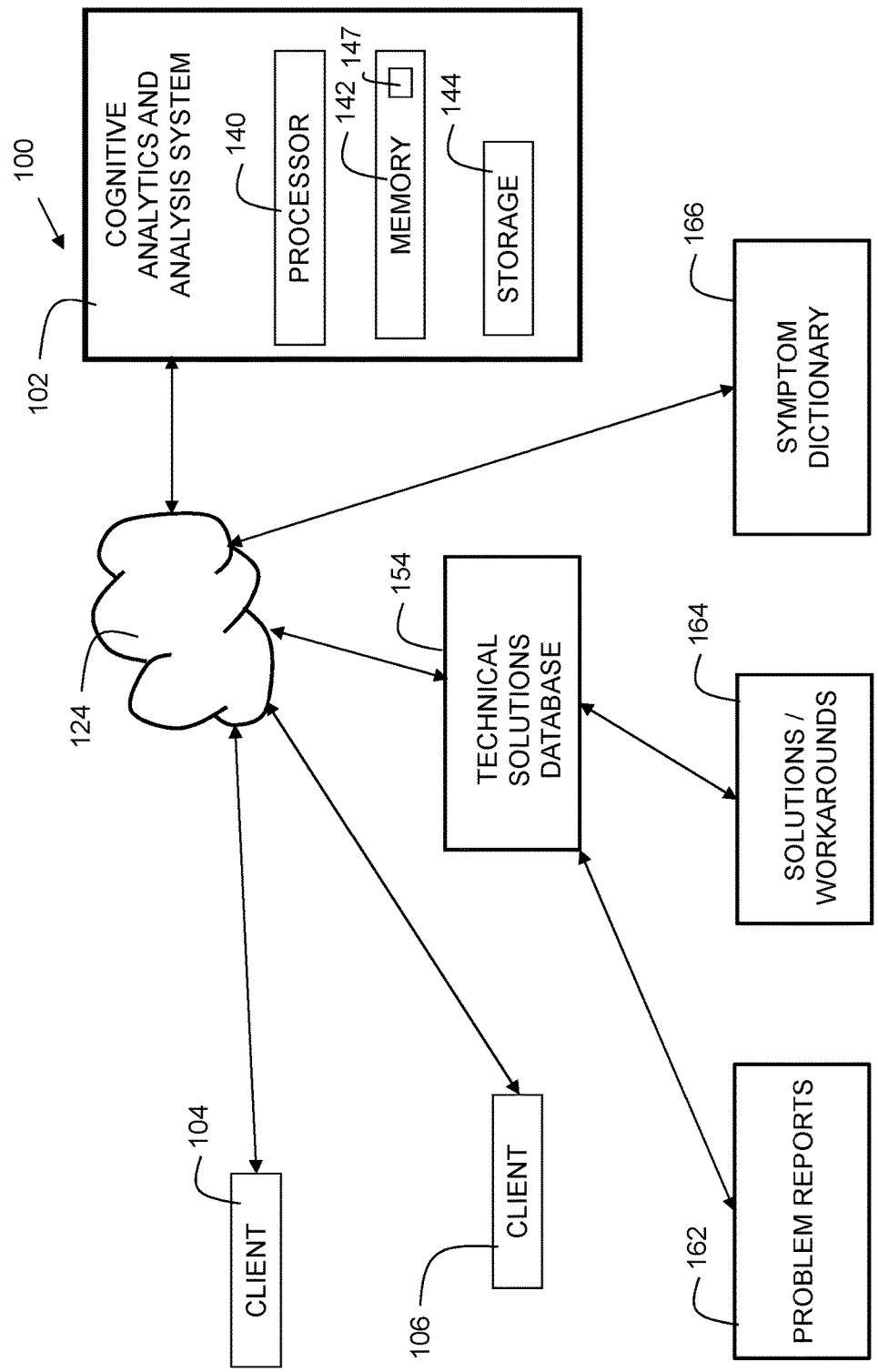
FIG. 1 is an environment for embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the figures may be omitted, or illustrated not-to-scale, for illustrative clarity.

DETAILED DESCRIPTION

Disclosed embodiments provide techniques for automated solution identification. Previously reported problem reports are analyzed and symptoms are extracted. Solutions are associated with the previously reported problem reports. A newly submitted user problem is analyzed and symptoms are extracted and compared with the symptoms of the previously reported problems. Solutions are then associated with the user problem based on relevance to symptoms, product type, and/or other factors.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, or elements.

FIG. 1 is a diagram 100 for an environment of embodiments of the present invention. A cognitive analytics and analysis system 102 includes a processor 140, memory 142, and storage 144. The processor 140 is coupled to the memory 142 such that it can access instructions 147 stored in memory 142. The processor 140 executes the instructions 147, stored in memory 142, in implementation of embodiments of the present invention. Memory 142 may include dynamic random-access memory (DRAM), static random-access memory (SRAM), magnetic storage, and/or a read only memory such as flash, EEPROM, optical storage, or other suitable memory. In some embodiments, the memory 142 may not be a transitory signal per se. The storage 144 may include one or more hard disks, solid state disks, or other suitable storage technology.

Cognitive analytics and analysis system 102 is an electronic computation device. Note that while one such device is illustrated in diagram 100, in practice, there may be multiple electronic computing devices operating in a distributed manner for load balancing and data redundancy.

Cognitive analytics and analysis system 102 is connected to network 124. Network 124 may be the Internet, a wide area network, a local area network, or any other suitable network. Also connected to the network are client devices 104 and 106. The client devices may have GPS or another geolocation receiver for determining the user's location. The client devices may also have Bluetooth®, Wi-Fi, or other suitable communication interface to determine the location of nearby users.

Technical solutions database 154 is also connected to network 124, and accessible by the cognitive analytics and analysis system 102. The technical solutions database 154 may include records for problem reports 162, and solutions and/or workarounds 164. In some embodiments, the problem reports 162 and solutions/workarounds 164 may reside in different databases, or may be stored in tables within the same database. A variety of database schema and types may be used in embodiments of the present invention, such as SQL, NoSQL, or other suitable database type.

Symptom dictionary 166 is another database connected to network 124, and accessible by the cognitive analytics and analysis system 102. The symptom dictionary 166 contains a plurality of linguistic entities, that can include words, n-grams, tuples, tokens, token phrases, and/or other information indicative of a computer system symptom. In embodiments, the linguistic entities are unigrams (single tokens). Examples of linguistic entities can include, but are not limited to, entries such as "disconnect," "reboot," "access denied," "error," "warning," and/or "freeze." In practice, many additional such symptom entries are present in the symptom dictionary 166.

Figure 2:
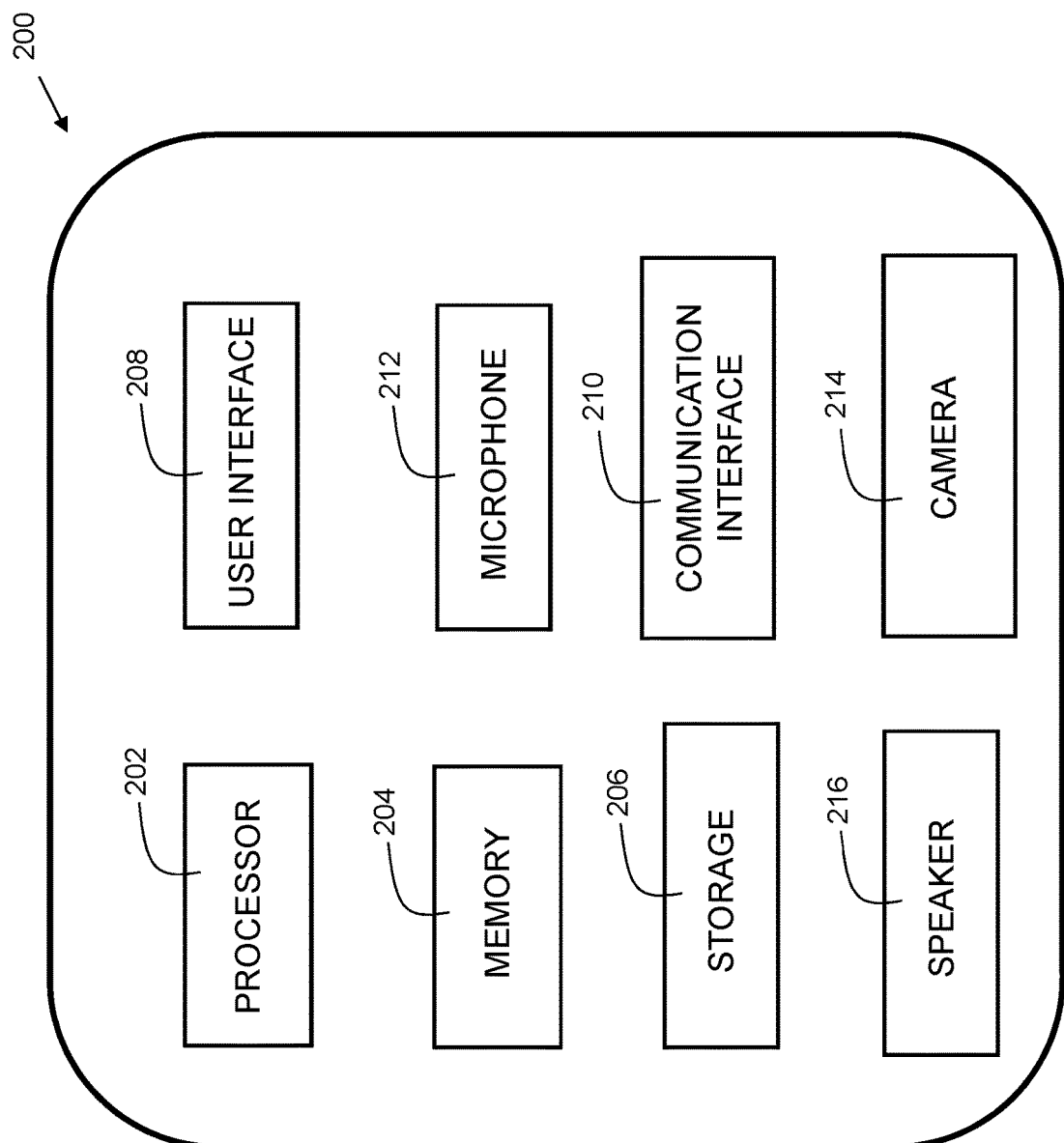
FIG. 2 is a block diagram of a client device used with embodiments of the present invention.

FIG. 2 is a client device 200 in accordance with embodiments of the present invention. The client device 200 may be a desktop computer, laptop computer, or a mobile device, such as a smartphone, tablet computer, or wearable device. Device 200 includes a processor 202, which is coupled to a memory 204. Memory 204 may include dynamic random-access memory (DRAM), static random-access memory (SRAM), magnetic storage, and/or a read only memory such as flash, EEPROM, optical storage, or other suitable memory. In some embodiments, the memory 204 may not be a transitory signal per se.

Device 200 may further include storage 206. In embodiments, storage 206 may include one or more magnetic storage devices such as hard disk drives (HDDs). Storage 206 may additionally or alternatively include one or more solid state drives (SSDs).

Device 200 further includes a user interface 208. This may include a display, keyboard, mouse, or other suitable interface. In some embodiments, the display may be touch-sensitive, such as a touchscreen.

The device 200 further includes a communication interface 210. The communication interface 210 may be a wired communication interface that includes Ethernet, Gigabit Ethernet, or the like. In embodiments, the communication interface 210 is wireless, including modulators, demodulators, and antennas for a variety of wireless protocols including, but not limited to, Bluetooth®, Wi-Fi, and/or cellular communication protocols for communication over a computer network.

The device 200 may further include a microphone 212 for receiving audio input. The device 200 may further include a camera 214. The camera may include a flash. The device 200 may further include a speaker 216. The speaker may be powered or passive.

Figure 3:
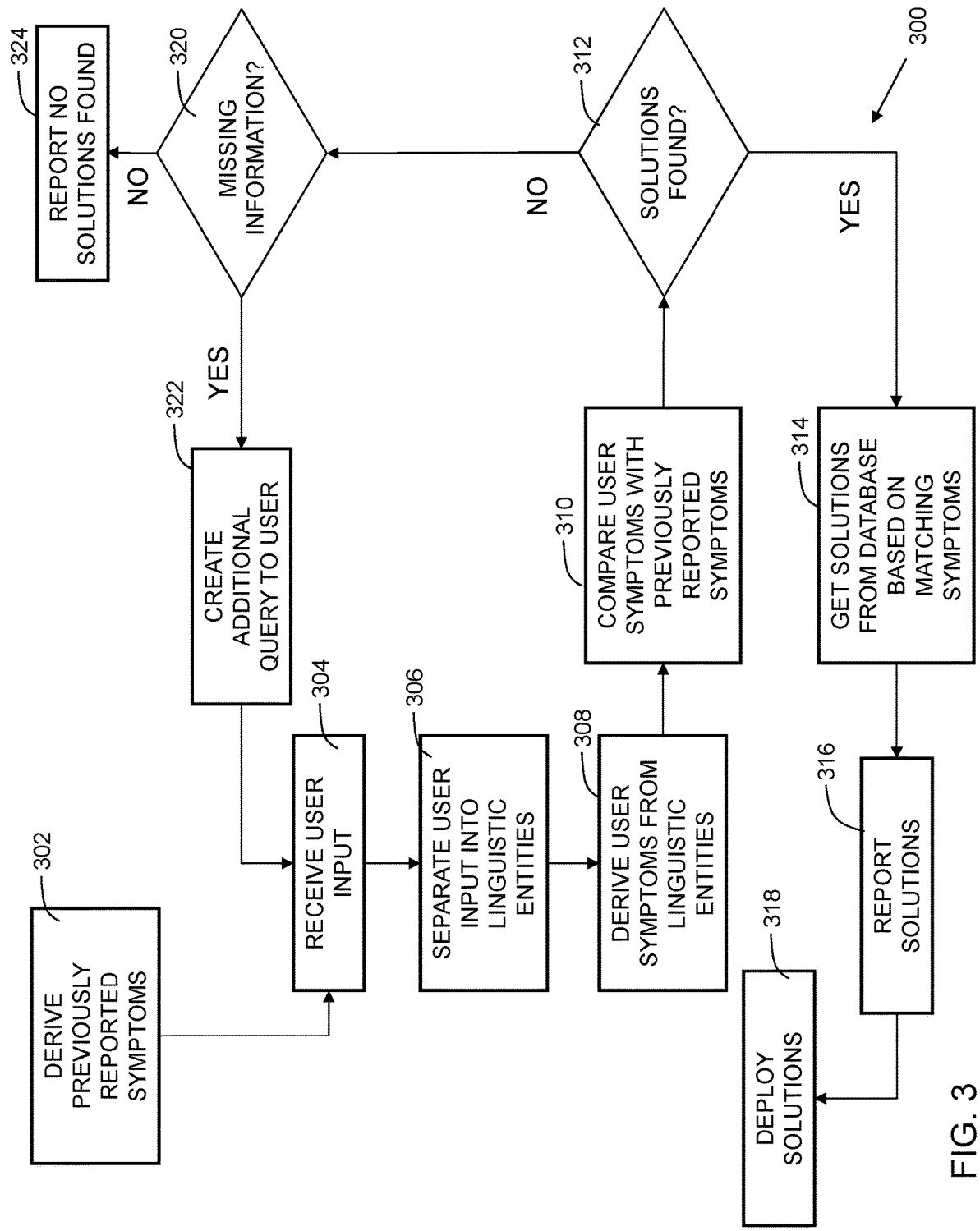
FIG. 3 is a flowchart indicating process steps for an embodiment of the present invention.

FIG. 3 is a flowchart 300 indicating process steps for an embodiment of the present invention. At process step 302, previously reported symptoms are derived. In embodiments, this is accomplished by analyzing text and/or other fields of problem reports. In embodiments, the problem reports are obtained from a customer relationship management (CRM) system such as Salesforce, JIRA, or other suitable system. The text of the problem reports is analyzed using natural language processing, machine learning, and/or other techniques to derive symptoms.

At process step 304, user input is received. In embodiments, this can be in the form of natural language written into a form as unstructured or semi-structured text. In some embodiments, a user may speak utterances into a microphone (e.g., 212 of FIG. 2) which are then converted to text by a speech-to-text process for entry into the cognitive analytics and analysis system 102. At process step 306, the user input is separated into linguistic entities, which can be tokens, words, parts of words, and/or other information. A filtering process may remove one or more tokens such as stop words, common parts of speech, and/or other information that is not deemed to be associated with symptoms.

At process step 308, user symptoms are derived from linguistic entities. Deriving symptoms from user input may be performed by identifying words in the description of symptoms that are included in the linguistic entities generated in process step 306, and then performing a filtering process by removing linguistic entities (tokens) that are not relevant to symptoms. In embodiments, this may be performed utilizing a dictionary (e.g., 166 of FIG. 1) that contains common symptom words/tokens. The resulting subset of user linguistic entities represent potential symptoms. These potential symptoms are then used to compare symptoms from previously submitted problem reports to identify problem reports that align with the user reported symptoms. Solutions associated with those problem reports may then be retrieved, ranked, and presented to a user for review and/or deployment.

In process step 310, user symptoms are compared with previously reported symptoms. In embodiments, the comparison of user symptoms with previously reported systems may be accomplished by computing a distance between the user reported symptoms, and the previously reported symptoms. In embodiments, for each previously identified solution, a Minkowski distance is computed for the identified linguistic entities corresponding to user symptoms. This distance may then be normalized. The previously identified solution with the shortest distance may be deemed most relevant to the user reported symptoms, and us associated with that previously submitted problem report. Thus, at this point, there is now a previously submitted problem report that is associated with the user symptoms. If one or more solutions exist for that previously submitted problem report, then that solution may be applicable to the user reported problem.

In process step 312, a check is made to see if any solutions are found. In embodiments, a predetermined value is established. If no solution exists that results in a Minkowski distance or other suitable scoring value that is below the predetermined value, then a no-solution state is determined. If, at 312, it is determined that at least one solution exists, then the process continues to process step 314, where solutions are retrieved from the database (e.g., 154 of FIG. 1) based on matching symptoms. At process step 316, the retrieved solutions are displayed on an electronic display. Optionally, one or more of the retrieved solutions are deployed at process step 318.

If, at 312, it is determined that a no-solution state exists, then the process proceeds to process step 320, where a check is made for missing information. The missing information can include environment information present in the problem reports and/or solutions. Environmental information can include, but is not limited to, product information (make, model, version, etc.), vendor information, configuration information (e.g., network, storage, processors, etc.), and/or other pertinent information for operation of the system. If missing information is identified, meaning that the user did not previously provide sufficient information to extract enough linguistic entities for Minkowski distance computation or other scoring techniques, then a query based on the missing information is created at process step 322. This is then presented to the user. User responses are then received at process step 304, and the process continues until either there is convergence, and one or more identified solutions are presented at process step 316. If at process step 320, no further information is identified for request, then the process proceeds to process step 324, where an indication is provided to the user that no solution is found. This can occur for new problems that have not been reported previously, and for which no known solution currently exists.

Accordingly, embodiments can include deriving previously reported symptoms from a problem report database. A user problem description is received. The user problem description is separated into a plurality of linguistic entities, deriving one or more user symptoms from the plurality of linguistic entities. The one or more user symptoms is compared with the previously reported symptoms. One or more solution descriptions associated with the previously reported symptoms is retrieved from a technical solutions database.

In some embodiments, deriving previously reported symptoms from a technical solutions database comprises: creating a plurality of linguistic entities for a plurality of problem reports; performing a linguistic entity filter process to create a first subset of linguistic entities; identifying linguistic entities from the first subset of linguistic entities that are present in a symptom dictionary to create a second subset of linguistic entities; and identifying problem reports associated with the second subset of linguistic entities.

Figure 4:
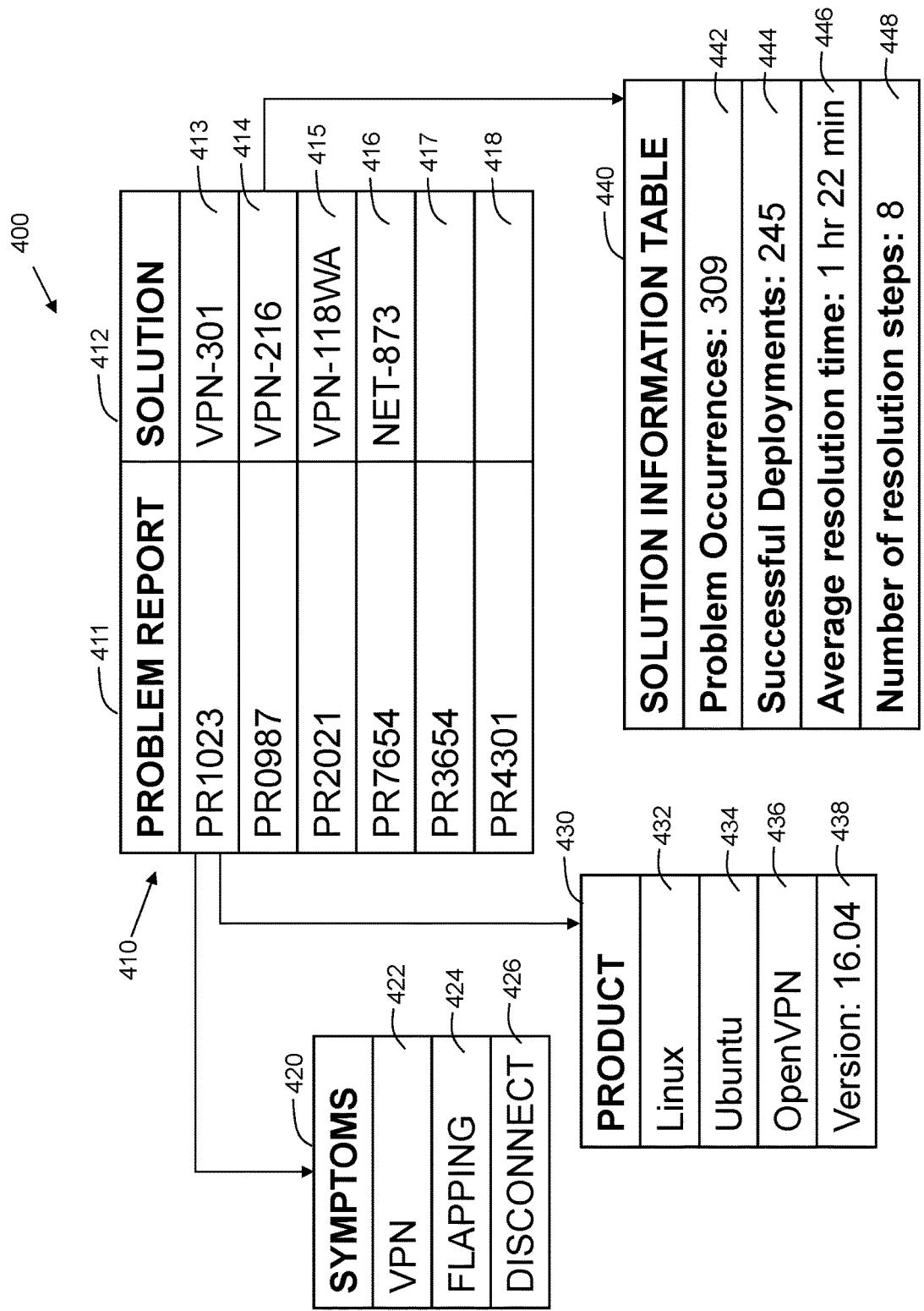
FIG. 4 shows data tables used in embodiments of the present invention.

FIG. 4 shows data tables 400 used in embodiments of the present invention. The data tables may be stored in a database such as an SQL database. Table 410 indicates a relationship between problem reports in column 411, and solutions in column 412. Each problem report and each solution are identified using an alphanumeric identifier. For example, as shown in row 413, problem report PR1023 is associated with solution VPN-301. As shown in row 414, problem report PR0987 is associated with solution VPN-216. As shown in row 415, problem report PR2021 is associated with solution VPN-118WA. As shown in row 416, problem report PR7654 is associated with solution NET-873. Some problem reports may not have a corresponding solution associated with them, such as PR3654 in row 417, and PR4301 in row 418. Furthermore, some solutions may be associated with multiple similar problem reports. Additionally, in some cases, multiple solutions may be associated with a single problem report.

Each problem report may reference a symptom table containing a list of symptoms associated with that problem report. The symptom table for a problem report may be automatically populated by analyzing a text portion of the problem report and extracting linguistic entities and comparing the linguistic entities with entries in a symptom dictionary. Linguistic entities that are found in the symptom dictionary are deemed to be symptoms of the problem report. For the sake of simplicity, only the symptom table 420 for PR1023 is shown in FIG. 4. However, the other problem reports each reference a similar symptom table corresponding to those particular problem reports. Symptom table 420 contains the entry "VPN" at row 422. Symptom table 420 contains the entry "Flapping" at row 424. Symptom table 420 contains the entry "Disconnect" at row 426.

Each problem report may reference a product table containing a list of products and/or versions associated with that problem report. The product table for a problem report may be automatically populated by analyzing a text portion of the problem report and extracting linguistic entities, corresponding to known products. For the sake of simplicity, only the product table 430 for PR1023 is shown in FIG. 4. However, the other problem reports each reference a similar product table corresponding to those particular problem reports. Product table 430 contains the entry "Linux" at row 432. Product table 430 contains the entry "Ubuntu" at row 434. Product table 430 contains the entry "OpenVPN" at row 436. Product table 430 contains the entry "Version 16.04" at row 438.

Each solution may reference a solution information table, containing metadata regarding a particular solution. The solution information table may contain information including, but not limited to, the number of problem occurrences for the problem report associated with this solution, the number of successful deployments of the solution, the average resolution time for the solution, and the number of resolution steps for the solution. For the sake of simplicity, only the solution information table 440 for VPN-301 is shown in FIG. 4. However, the other solutions each reference a similar solution information table corresponding to those particular solutions. Solution information table 440 contains the number of problem occurrences corresponding to PR0987 at row 442. Solution information table 440 contains the number of successful deployments of solution VPN-216 at row 444. Solution information table 440 contains the average resolution time of solution VPN-216 at row 446. Solution information table 440 contains the number of resolution steps for solution VPN-216 at row 448. The data tables 400 are exemplary, and other tables and/or schema may be used in addition to, or in place of, the tables shown in FIG. 4.

Embodiments can include ranking the one or more solution descriptions based on resolution criteria. The one or more solution descriptions are displayed on an electronic display. In embodiments, ranking the one or more solution descriptions based on resolution criteria includes ranking the one or more solution descriptions based on a number of associated problem occurrences. In some embodiments, solutions that have a higher number of associated problem occurrences receive a higher ranking, as problems that occur more frequently may be more likely to be encountered by other users.

In embodiments, ranking the one or more solution descriptions based on resolution criteria includes ranking the one or more solution descriptions based on a number of successful deployments. A successful deployment of a solution occurs when deploying the solution resolves the user problem. In some cases, a solution may be deployed, but does not result in resolving the user problem. This can occur, for example, when the user problem is not correctly described, categorized, or is a new problem that has not yet been encountered and for which no solution currently exists. A large number of successful deployments indicates that the solution has resolved user problems many times, and thus may be likely to resolve the current user problem as well.

In embodiments, ranking the one or more solution descriptions based on resolution criteria includes ranking the one or more solution descriptions based on an average resolution time. A shorter resolution time is generally preferable to a longer resolution time. Thus, solutions with a shorter resolution time may be ranked higher. This allows users to try a quicker solution first, and only trying more time-consuming solutions if the simpler ones do not resolve the user problem. In embodiments, ranking the one or more solution descriptions based on resolution criteria includes ranking the one or more solution descriptions based on a number of resolution steps. Thus, solutions with a smaller number of resolution steps may be ranked higher. This allows users to try a simpler solution first, and only trying more complex solutions if the simpler ones do not resolve the user problem.

Figure 5:
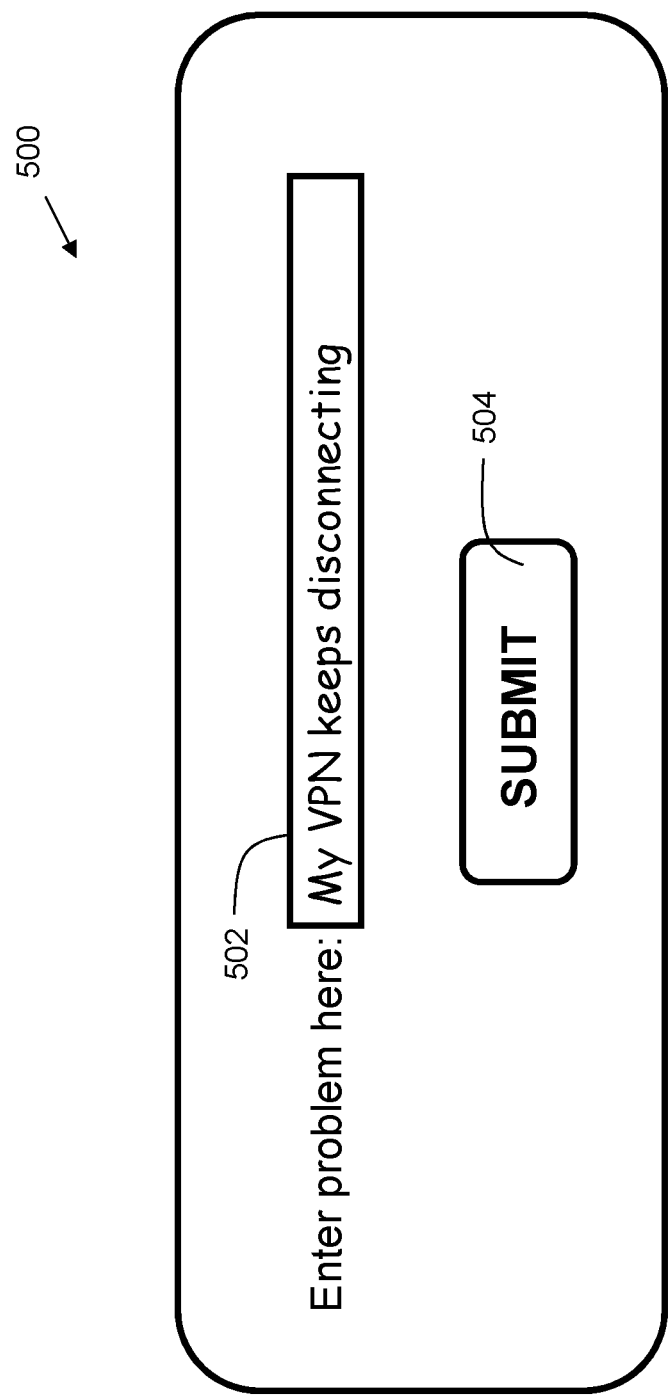
FIG. 5 shows a sample user problem description input in accordance with embodiments of the present invention.

FIG. 5 shows a sample user problem description user interface 500 in accordance with embodiments of the present invention. Field 502 accepts input from a user in natural language. The input can be unstructured text or semi-structured text. As shown in the example, the user input shows the phrase "My VPN keeps disconnecting" at field 502. The user can then press the submit button 504 to send the user input to the cognitive analytics and analysis system, where the symptoms are extracted and compared with symptoms of previously submitted and resolved problem reports. If symptoms from a resolved problem report are similar or matching to the symptoms derived from the user input, then the solution corresponding to the resolved problem report is presented to the user.

Figure 6:
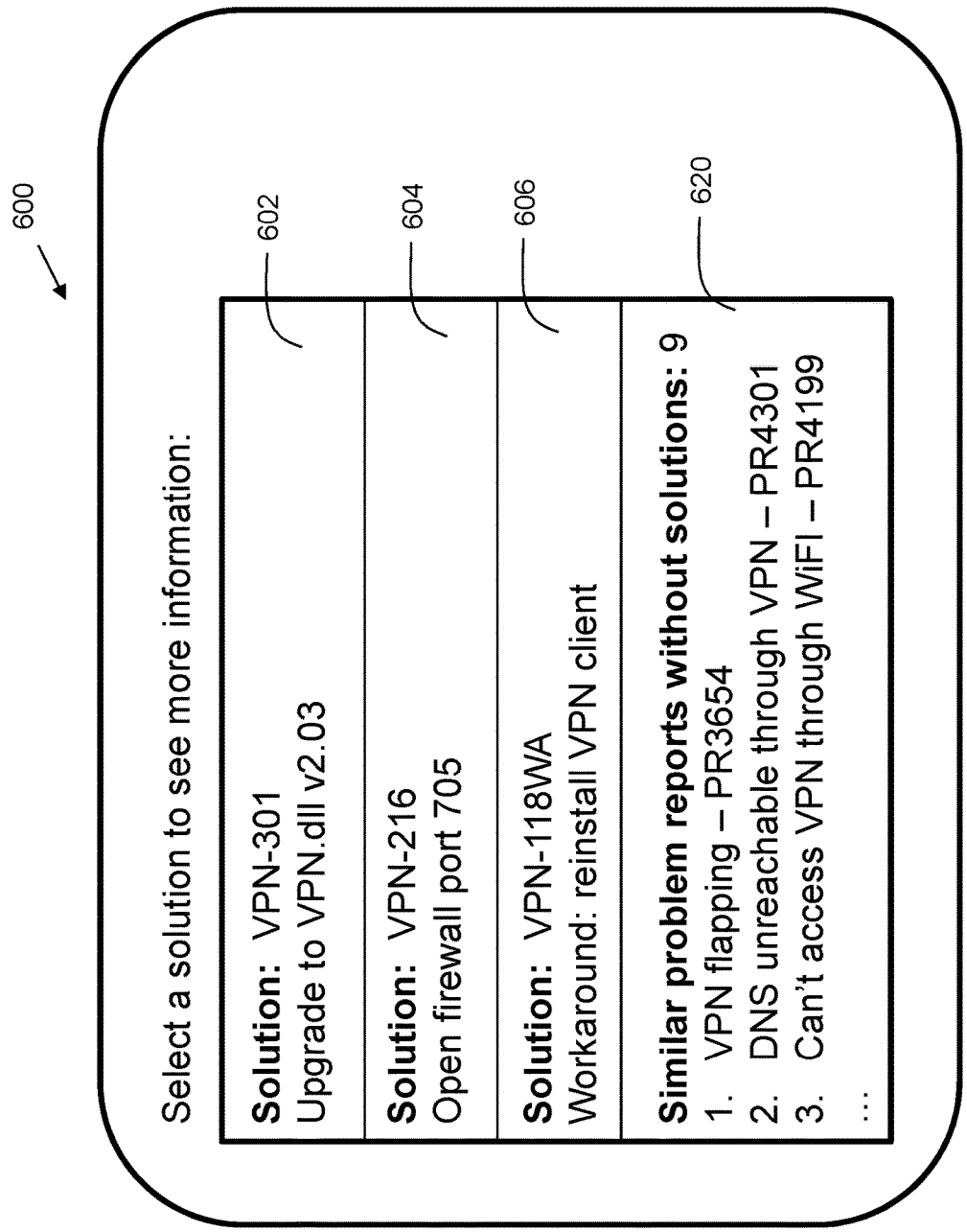
FIG. 6 shows a sample solution description listing display in accordance with embodiments of the present invention.

FIG. 6 shows a sample solution description listing 600 in accordance with embodiments of the present invention. Listing 600 includes three solutions, indicated at rows 602, 604, and 606, respectively. Each solution includes a solution identifier and summary information. Embodiments include identifying solutions associated with one or more of the identified problem reports that are associated with the second subset of linguistic entities.

The solution indicated at row 602 has identifier VPN-301. The solution indicated at row 604 has identifier VPN-216. The solution indicated at row 606 has identifier VPN-118WA. In some embodiments, workarounds are handled distinctly from solutions. In general, a workaround may be a short-term solution to work past a problem, whereas a solution offers a more permanent and proper way to resolve an issue. Some embodiments may further include a listing of similar problem reports without associated solutions, as shown in field 620. As shown in FIG. 6, there are 9 similar problem reports without corresponding solutions, with the first three being shown in the field. In embodiments, the field 620 may include a scrollable list to allow additional problem reports to be viewed. This information can be helpful for both users and system administrators to see if there is a trend of similar problem reports that are unresolved. If such a trend is detected, the priority of those problem reports can be escalated automatically. In some embodiments, this may include altering data in a customer relationship management (CRM) system such as Salesforce, JIRA, or other suitable system. By automatically raising the priority of such problem reports, project managers, developers, and other stakeholders can be alerted to a potential crisis before it fully develops, such that mitigation steps can be taken at the earliest possible time.

Figure 7:
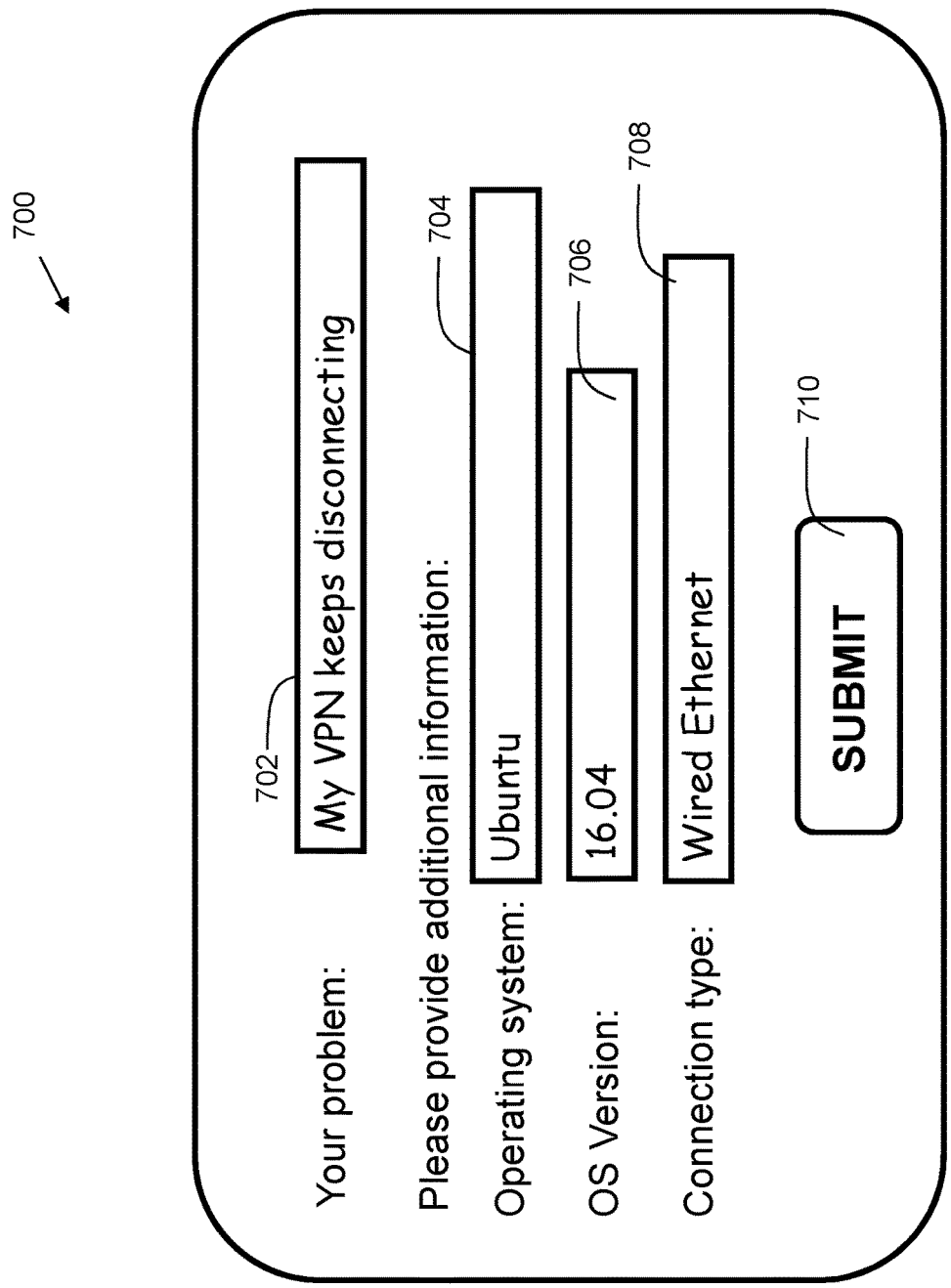
FIG. 7 shows an example additional query in accordance with embodiments of the present invention.

FIG. 7 shows an example additional query user interface 700 in accordance with embodiments of the present invention. At field 702, the originally reported problem (see 502 of FIG. 5) is shown. This is automatically populated from the input in field 502 of FIG. 5. At fields 704, 706, and 708, additional information is requested. In embodiments, the additional information used to build the query 700 can be derived from information in the product table 430. The information in the product table may be used to identify similar problem reports, by comparing it to product information provided by the user. In the case where the user does not provide sufficient product information, the additional query can request that information. In this example, the operating system (OS), OS version, and connection type are requested. Once the user enters the information, the user can then press the submit button 710 to send the user input to the cognitive analytics and analysis system (102 of FIG. 1) for use in comparison with previously submitted and resolved problem reports.

Accordingly, embodiments can include, in response to determining a no-solution state: identifying missing information from the received user problem description, and generating an additional user query corresponding to the missing information.

Figure 8:
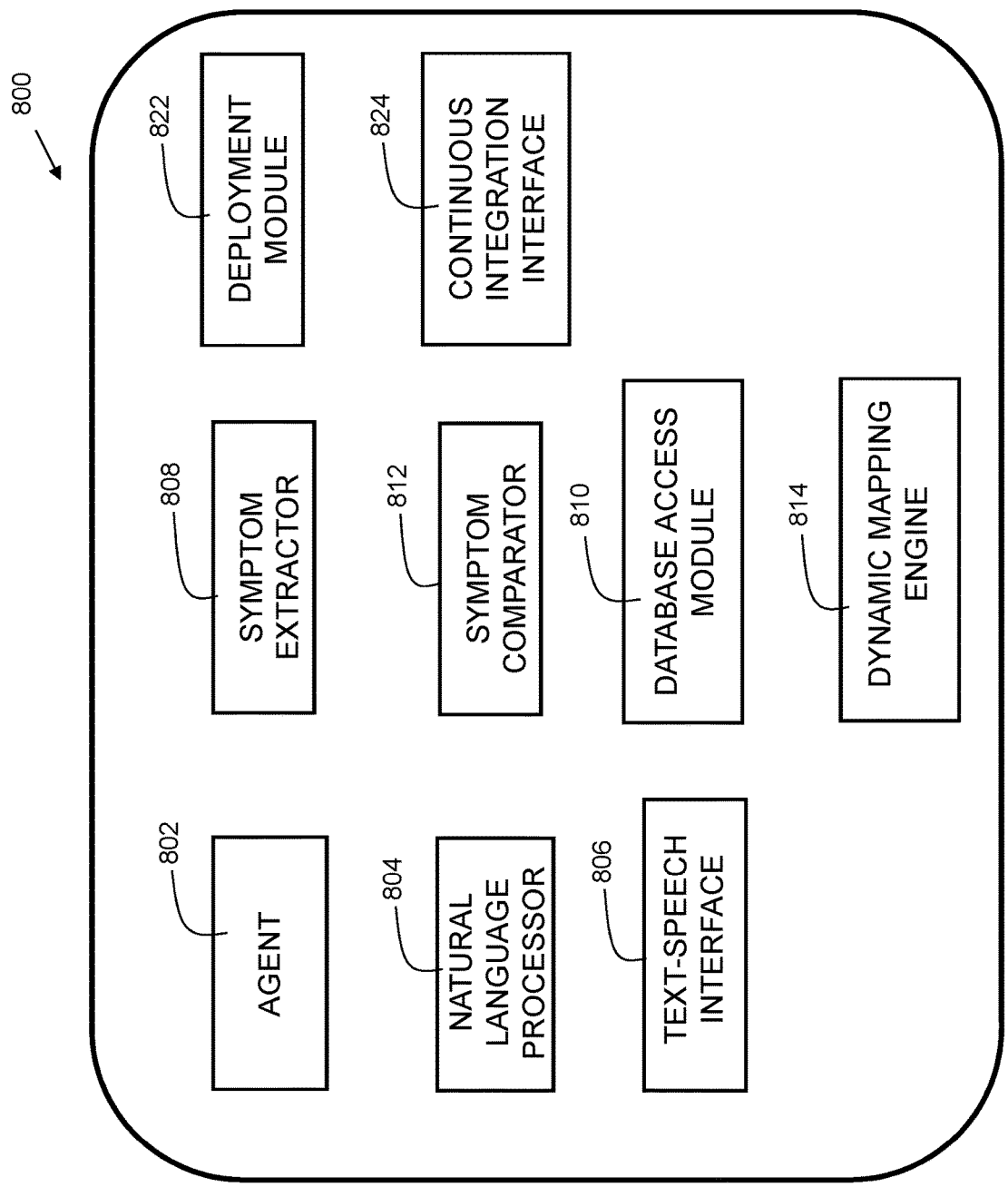
FIG. 8 shows a block diagram of modules in accordance with embodiments of the present invention.

FIG. 8 shows a block diagram 800 of modules in accordance with embodiments of the present invention. These modules may be implemented in software executing on cognitive analytics and analysis system 102, implemented in hardware such as special purpose ASICs, FPGAs, or other suitable hardware, and/or a combination of both hardware and software. Agent 802 receives user input. Natural language processor 804 parses natural language, and may perform various tasks such as tokenization, part-of-speech identification, disambiguation, language identification, and/or other processes. Text-speech interface 806 may be used in some embodiments to convert speech uttered by users to text that can be processed by the other modules in the cognitive analytics and analysis system 102. A symptom extractor module 808 extracts symptoms from user input and/or previously reported problem reports (PRs). A system comparator module 812 compares symptoms from the user input with symptoms from previously submitted problem reports. The database access module 810 accesses one or more databases to retrieve problem reports, solutions, workarounds, and/or other knowledge base information.

The dynamic mapping engine (DME) 814 implements a dynamic search engine to generate outputs in the form of a problem report number, symptom(s), problem description, action plan, and/or resolution steps. The DME can support multiple problem report numbers, action plans, solutions, and/or resolutions associated with a given user problem report.

Embodiments may include unsupervised learning, and include use of an Enhanced Affinity Propagation Model in which a Min$\{S(I,k)=\|tsi-pk\|2\}$ is identified. A responsibility matrix R is computed where R: r(I,k)—correlates pk to tsi. An availability matrix A: a(I,k) represents an appropriateness factor to correlate pk to tsi. The R and A matrixes are initialized to zero, and an iteration is performed as follows:
Step1: $r(I,k) \leftarrow s(I,k)-\max\{a(I,k')+s(I,k')\}$
Step2: $a(I,k) \leftarrow \min(0,r(k,k)+\text{sum}(\max(0,r(I',k))))$
Stop Conditions: $(r(I,i)+a(I,i))>0)$
Output: n clusters with pi . . . pn versus tsi . . . tsm The resulting output may include action plans, resolutions, command references, product classifications, environmental classifications, and/or other information that is then loaded into one or more knowledge bases.

In some embodiments, inputs to a solution table are generated from this model, serving as a cognitive classifier. Thus, data analysis can be performed utilizing unsupervised models, alleviating the need for developing training data. Based on identified solutions, a number of clusters are derived. The clusters include information such as problem report categories, environmental conditions, workarounds, and/or other relevant information. Each cluster is assigned a numeric value, and clustering is dynamic, as it retrains based on a continuously increasing number of available solutions.

In embodiments, once clusters are generated, a linguistic entity algorithm is executed to extract tri grams from each cluster. In some embodiments, linguistic entities are passed through a Continued Fraction Model (CFM), which assigns specific trigrams to a corresponding solution class. Hyperplanes are constructed automatically per the CFM. Margin maximization for hyperplanes is achieved through cluster numeric values. Furthermore, no training data is provided/required to train the classification model. The clusters, linguistic entities and Continued Fraction Model automatically generate features that are usable by classification planes. In this way, the classification is performed as a multistep feature extraction process to improve the model accuracy that is evaluated real time, and accordingly, hyperplanes are adjusted for classifying the customer intent with right class of problem.

Optionally, some embodiments may include a deployment module 822. The deployment module may utilize SOAP, RESTful APIs, or other suitable protocol to deploy solutions. Solutions can include actions such as upgrading or downgrading a software package, library, or object on a client device (e.g., client device 104). Additionally, solutions can include actions such as upgrading or downgrading a software package, library, or object on a backend machine such as a cloud server, virtual machine, or containerized machine. In some embodiments, the cognitive analytics and analysis system 102 includes a continuous integration interface 824 to interact with a continuous integration system such as Jenkins in order to build and/or deploy artifacts needed for execution of the solution. These modules represent one embodiment, and other embodiments may utilize more, fewer, and/or different modules or functions.

Figure 9:
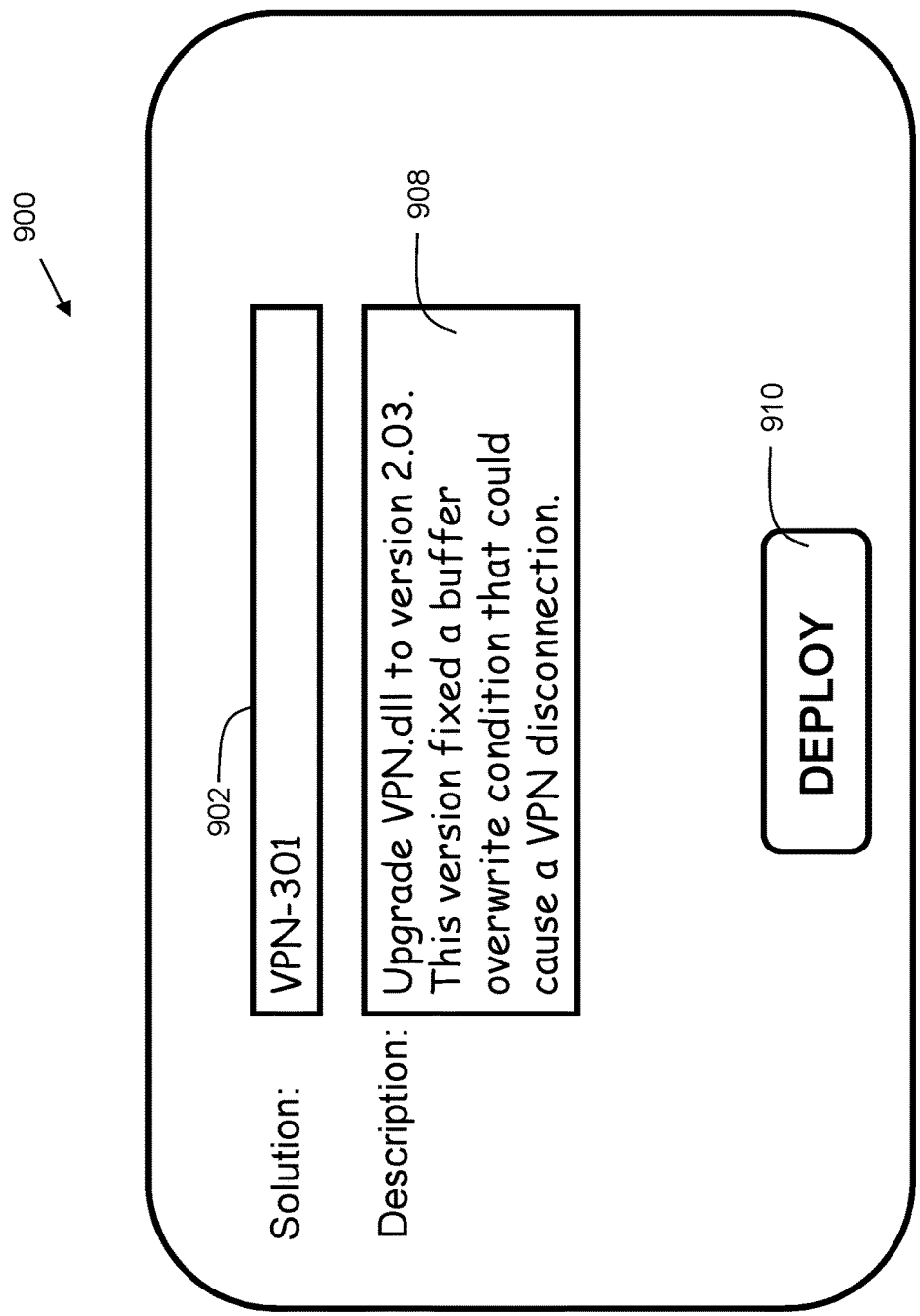
FIG. 9 shows an example deployment user interface in accordance with embodiments of the present invention.

FIG. 9 shows an example deployment user interface 900 in accordance with embodiments of the present invention. Field 902 shows an alphanumeric identifier associated with a solution. Field 908 provides a description of the solution. The user can then press the deploy button 910 to instruct the cognitive analytics and analysis system to deploy the solution. Embodiments can further include deploying a solution selected from the one or more solution descriptions.

Figure 10:
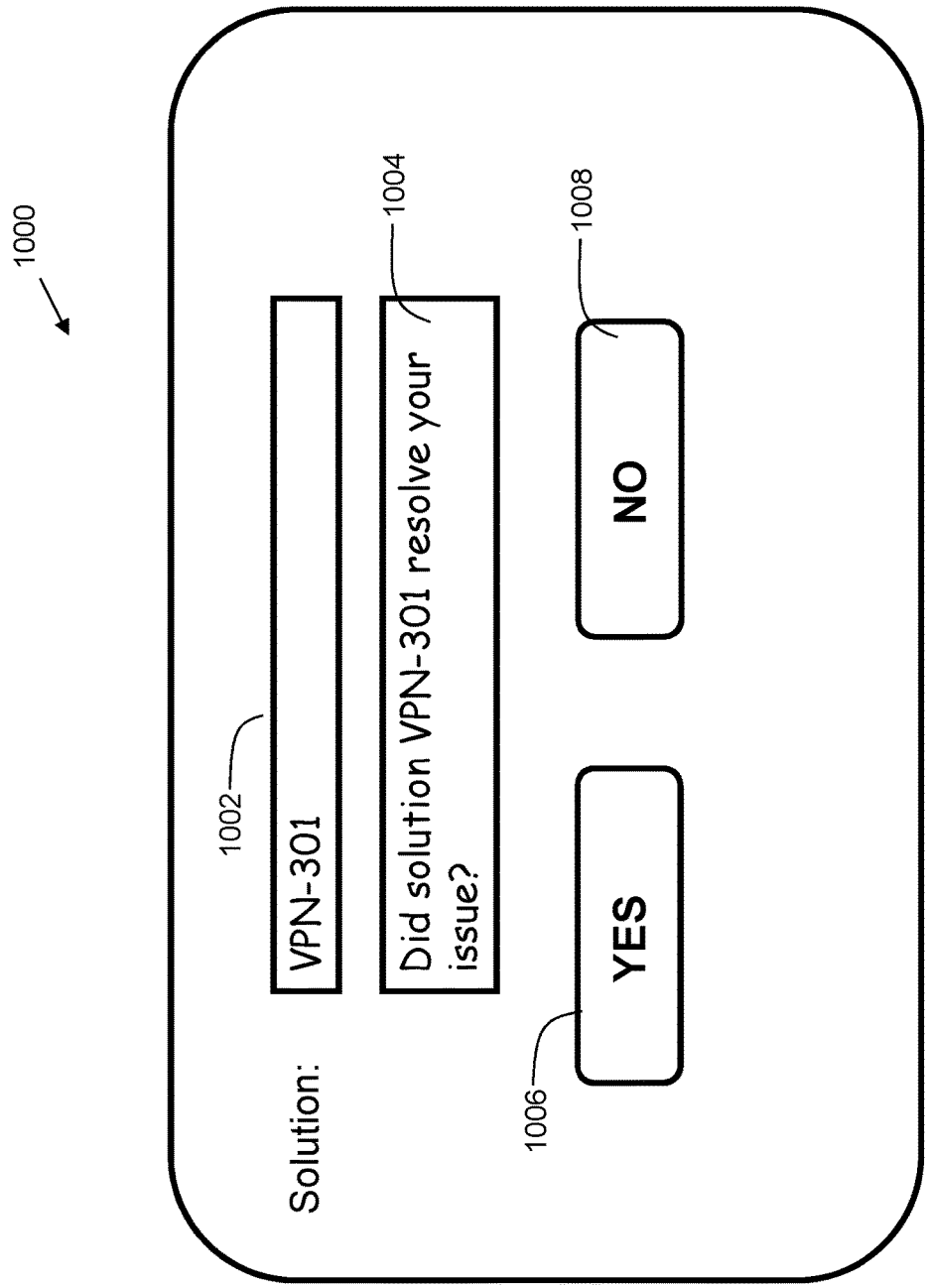
FIG. 10 shows an example confirmation user interface in accordance with embodiments of the present invention.

FIG. 10 shows an example confirmation user interface 1000 in accordance with embodiments of the present invention. Field 1002 shows an alphanumeric identifier associated with a solution. Field 1004 prompts the user if the deployed solution has resolved the issue. The user can then press the "yes" button 1006 to indicate that it did resolve the issue, or alternatively, the user can press the "no" button 1008 to indicate that it did not resolve the issue. This information can then be used to update the successful deployments information (row 444 of FIG. 4) accordingly.

Figure 11:
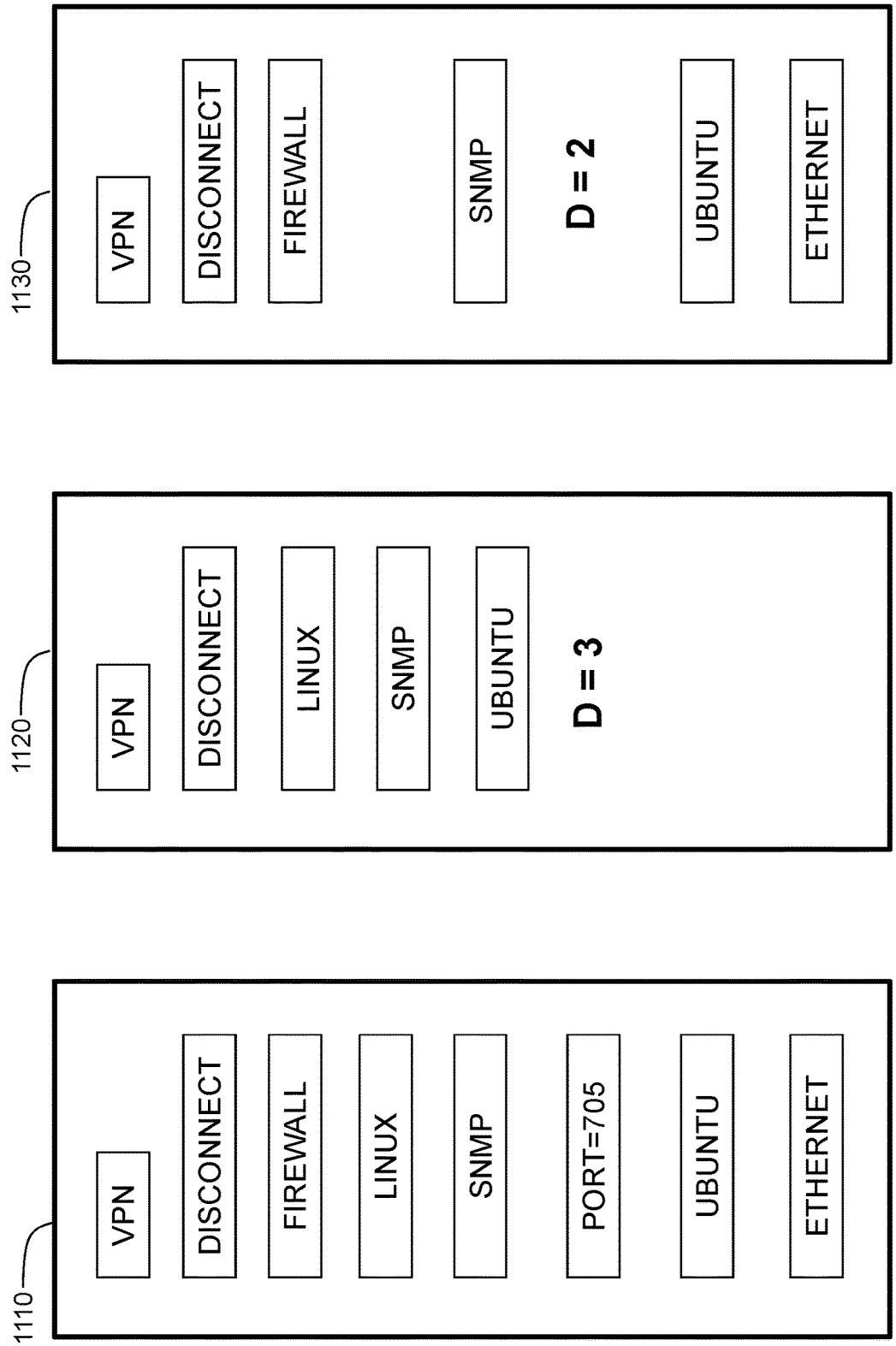
FIG. 11 shows an example of comparing user symptoms with previously reported symptoms.

FIG. 11 shows an example of comparing user symptoms with previously reported symptoms. A user reported symptom record 1110 includes a list of linguistic entities extracted from a problem description via computer-implemented natural language processing techniques. Two previously reported problem report linguistic entity lists are shown at 1120 and 1130. Each list 1120 contains some of the linguistic entities contained in the record 1110 pertaining to the newly reported problem. In embodiments, the number of non-matching linguistic entities in the user reported symptom record 1110 can be used as the basis for computing a distance, such as a Minkowski distance, Hamming distance, Manhattan distance, or other suitable distance. In the example shown, three linguistic entities from the user reported symptom record 1110 are missing from the previously reported problem report linguistic entity list 1120, giving it a distance of 3. Similarly, two linguistic entities from the user reported symptom record 1110 are missing from the previously reported problem report linguistic entity list 1130, giving it a distance of 2. Hence, previously reported problem report linguistic entity list 1130 is deemed to be more similar to the user reported symptom record 1110 than previously reported problem report linguistic entity list 1120, since it has a shorter distance. Other cluster analysis techniques for evaluating similarity of datasets may be used in embodiments of the present invention.

As can now be appreciated, disclosed embodiments provide improvements in the field of technical support. Previously reported problem reports are analyzed and symptoms are extracted. Solutions are associated with the previously reported problem reports. A newly submitted user problem is analyzed and symptoms are extracted and compared with the symptoms of the previously reported problems. Solutions are then associated with the user problem based on relevance to symptoms, product type, and/or other factors. In some embodiments, additional queries may be generated and sent to the user to obtain more information to enable more relevancy in the provided solutions. In yet other embodiments, the solutions are integrated to a deployment system, continuous integration system, and/or other infrastructure for deploying an identified solution. Embodiments can also serve to establish a baseline or starting point for technical support when limited or no historical data exists. Thus, disclosed embodiments can serve to reduce resolution time by quickly identifying solutions using computer-implemented techniques, allowing scalability in customer support request handling by leveraging machine learning, natural language processing, and knowledge bases.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/ or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer-implemented method for automated solution identification, comprising:
    deriving previously reported symptoms from a problem report database;
    receiving a user problem description;
    separating the user problem description into a plurality of linguistic entities;
    deriving one or more user symptoms from the plurality of linguistic entities;
    comparing the one or more user symptoms with the previously reported symptoms by computing Minkowski distances between the previously reported symptoms and each of the one or more user symptoms;
    normalizing the Minkowski distances to create normalized distances;
    when one or more solution descriptions associated with the previously reported symptoms that match the one or more user symptoms exist,
        retrieving the one or more solution descriptions associated with the previously reported symptoms from a technical solutions database,
        identifying a solution description from the one or more solution descriptions based on being associated with a shortest distance among the normalized distances,
        ranking the one or more solution descriptions based on resolution criteria, displaying the one or more solution descriptions on an electronic display, and
        deploying a solution selected from the one or more solution descriptions;
    when one or more solution descriptions associated with the previously reported symptoms that match the one or more user symptoms do not exist,
        providing a list of a plurality of problem reports, similar to the user problem description, without associated solutions,
        detecting a trend among said plurality of problem reports without associated solutions, and
        escalating a priority of said plurality of problem reports.

2. The computer-implemented method of claim 1, wherein deriving previously reported symptoms from a technical solutions database comprises:
    creating a plurality of linguistic entities for a plurality of problem reports;
    performing a linguistic entity filter process to create a first subset of linguistic entities;
    identifying linguistic entities from the first subset of linguistic entities that are present in a symptom dictionary to create a second subset of linguistic entities; and
    identifying problem reports associated with the second subset of linguistic entities.

3. The computer-implemented method of claim 2, further comprising identifying solutions associated with one or more of the identified problem reports that are associated with the second subset of linguistic entities.

4. The computer-implemented method of claim 3, further comprising, in response to determining a no-solution state:
    identifying missing information from the received user problem description; and generating an additional user query corresponding to the missing information.

5. The computer-implemented method of claim 1, wherein ranking the one or more solution descriptions based on resolution criteria includes ranking the one or more solution descriptions based on a number of associated problem occurrences.

6. The computer-implemented method of claim 1, wherein ranking the one or more solution descriptions based on resolution criteria includes ranking the one or more solution descriptions based on a number of successful deployments.

7. The computer-implemented method of claim 1, wherein ranking the one or more solution descriptions based on resolution criteria includes ranking the one or more solution descriptions based on an average resolution time.

8. The computer-implemented method of claim 1, wherein ranking the one or more solution descriptions based on resolution criteria includes ranking the one or more solution descriptions based on a number of resolution steps.

9. The computer-implemented method of claim 1, wherein the one or more solution description associated with the previously reported symptoms are the result of a Minkowski distance that is below a predetermined value.

10. An electronic computation device comprising:
a processor;
a memory coupled to the processor, the memory containing instructions, that when executed by the processor, perform the steps of:
deriving previously reported symptoms from a problem report database;
receiving a user problem description;
separating the user problem description into a plurality of linguistic entities;
deriving one or more user symptoms from the plurality of linguistic entities;
comparing the one or more user symptoms with the previously reported symptoms by computing Minkowski distances between the previously reported symptoms and each of the one or more user symptoms;
normalizing the Minkowski distances to create normalized distances;
when one or more solution descriptions associated with the previously reported symptoms that match the one or more user symptoms exist,
retrieving one or more solution descriptions associated with the previously reported symptoms from a technical solutions database; and
identifying a solution description from the one or more solution descriptions based on being associated with a shortest distance among the normalized distances,
ranking the one or more solution descriptions based on resolution criteria,
displaying the one or more solution descriptions on an electronic display, and
deploying a solution selected from the one or more solution descriptions;
when one or more solution descriptions associated with the previously reported symptoms that match the one or more user symptoms do not exist,
providing a list of a plurality of problem reports, similar to the user problem description, without associated solutions,
detecting a trend among said plurality of problem reports without associated solutions, and
escalating a priority of said plurality of problem reports.

11. The electronic computation device of claim 10, wherein the memory further comprises instructions, that when executed by the processor, perform the steps of:
creating a plurality of linguistic entities for a plurality of problem reports;
performing a linguistic entity filter process to create a first subset of linguistic entities;
identifying linguistic entities from the first subset of linguistic entities that are present in a symptom dictionary to create a second subset of linguistic entities; and
identifying problem reports associated with the second subset of linguistic entities.

12. The electronic computation device of claim 11, wherein the memory further comprises instructions, that when executed by the processor, perform the step of identifying solutions associated with one or more of the identified problem reports that are associated with the second subset of linguistic entities.

13. The electronic computation device of claim 12, wherein the memory further comprises instructions, that when executed by the processor, perform the steps of:
in response to determining a no-solution state, identifying missing information from the received user problem description; and
generating an additional user query corresponding to the missing information.

14. The electronic computation device of claim 13, wherein the memory further comprises instructions, that when executed by the processor, perform the steps of:
ranking the one or more solution descriptions based on resolution criteria; and
displaying the one or more solution descriptions on an electronic display.

15. A computer program product for an electronic computation device comprising a computer readable storage medium having program instructions embodied therewith, the program instructions executable by a processor to cause the electronic computation device to perform the steps of:
deriving previously reported symptoms from a problem report database;
receiving a user problem description;
separating the user problem description into a plurality of linguistic entities;
deriving one or more user symptoms from the plurality of linguistic entities;
comparing the one or more user symptoms with the previously reported symptoms by computing Minkowski distances between the previously reported symptoms and each of the one or more user symptoms;
normalizing the Minkowski distances to create normalized distances;
when one or more solution descriptions associated with the previously reported symptoms that match the one or more user symptoms exist,
retrieving one or more solution descriptions associated with the previously reported symptoms from a technical solutions database; and
identifying a solution description from the one or more solution descriptions based on being associated with a shortest distance among the normalized distances,
ranking the one or more solution descriptions based on resolution criteria,
displaying the one or more solution descriptions on an electronic display, and
deploying a solution selected from the one or more solution descriptions;

when one or more solution descriptions associated with the previously reported symptoms that match the one or more user symptoms do not exist,
providing a list of a plurality of problem reports, similar to the user problem description, without associated solutions,
detecting a trend among said plurality of problem reports without associated solutions, and
escalating a priority of said plurality of problem reports.

16. The computer program product of claim 15, wherein the computer readable storage medium includes program instructions executable by the processor to cause the electronic computation device to perform the steps of:
creating a plurality of linguistic entities for a plurality of problem reports;
performing a linguistic entity filter process to create a first subset of linguistic entities;
identifying linguistic entities from the first subset of linguistic entities that are present in a symptom dictionary to create a second subset of linguistic entities; and
identifying problem reports associated with the second subset of linguistic entities.

17. The computer program product of claim 16, wherein the computer readable storage medium includes program instructions executable by the processor to cause the electronic computation device to perform the step of identifying solutions associated with one or more of the identified problem reports that are associated with the second subset of linguistic entities.

18. The computer program product of claim 17, wherein the computer readable storage medium includes program instructions executable by the processor to cause the electronic computation device to perform the steps of:
in response to determining a no-solution state, identifying missing information from the received user problem description; and
generating an additional user query corresponding to the missing information.

19. The computer program product of claim 18, wherein the computer readable storage medium includes program instructions executable by the processor to cause the electronic computation device to perform the steps of:
ranking the one or more solution descriptions based on resolution criteria;
and displaying the one or more solution descriptions on an electronic display.

* * * * *